(12) United States Patent
Kamlah

(10) Patent No.: US 6,965,296 B2
(45) Date of Patent: Nov. 15, 2005

(54) METHOD OF DETERMINING THE POSITION OF AN OBJECT AND CONTROLLING ACCESS TO AN OBJECT OR USE OF AN OBJECT

(75) Inventor: Siegfried Kamlah, Braunschweig (DE)

(73) Assignee: Siemens Aktiengesellschaft, Munich (DE)

(*) Notice: Subject to any disclaimer, the term of this patent is extended or adjusted under 35 U.S.C. 154(b) by 350 days.

(21) Appl. No.: 09/951,387

(22) Filed: Sep. 14, 2001

(65) Prior Publication Data

US 2002/0067250 A1 Jun. 6, 2002

(30) Foreign Application Priority Data

Sep. 15, 2000 (DE) ................ 100 45 776

(51) Int. Cl.[7] .............................................. G05B 5/19
(52) U.S. Cl. .................. 340/5.72; 340/539.13; 340/5.7; 340/10.41
(58) Field of Search ................ 340/539.13, 5.7, 340/5.72, 825.77, 10.41

(56) References Cited

U.S. PATENT DOCUMENTS

| | | | | |
|---|---|---|---|---|
| 5,172,056 A | * | 12/1992 | Voisin | .................. 324/207.17 |
| 5,525,967 A | * | 6/1996 | Azizi et al. | ............... 340/572.1 |
| 5,661,470 A | * | 8/1997 | Karr | ......................... 340/10.33 |
| 5,790,043 A | * | 8/1998 | Hettich et al. | ............. 340/5.62 |
| 5,983,347 A | * | 11/1999 | Brinkmeyer et al. | ....... 340/5.62 |

FOREIGN PATENT DOCUMENTS

| | | |
|---|---|---|
| DE | 2625719 C1 | 3/1991 |
| DE | 41 07 116 A1 | 9/1992 |
| DE | 41 07 803 A1 | 9/1992 |
| DE | 196 47 098 A1 | 6/1998 |
| DE | 197 38 323 C1 | 2/1999 |
| DE | 198 36 957 C1 | 9/1999 |

OTHER PUBLICATIONS

"Radio System for Radio Location and Navigation;" Publisher: Berlin Union GmbH c. 1997.
"A Phase Measurement Radio Positioning System for Indoor Use" by Matthew S. Reynolds; c. 1999.

* cited by examiner

Primary Examiner—Brian Zimmerman
(74) Attorney, Agent, or Firm—Morrison & Foerster LLP

(57) ABSTRACT

The position of a movable object is determined by a signal being transmitted by each of a number of antennas arranged in a spatially distributed manner of a fixed object to the movable object. In the movable object, on the one hand signal transit times are measured, and on the other hand the direction from which the signals are received are determined. From the two, the exact position of the object is determined with geometrical aids.

6 Claims, 4 Drawing Sheets

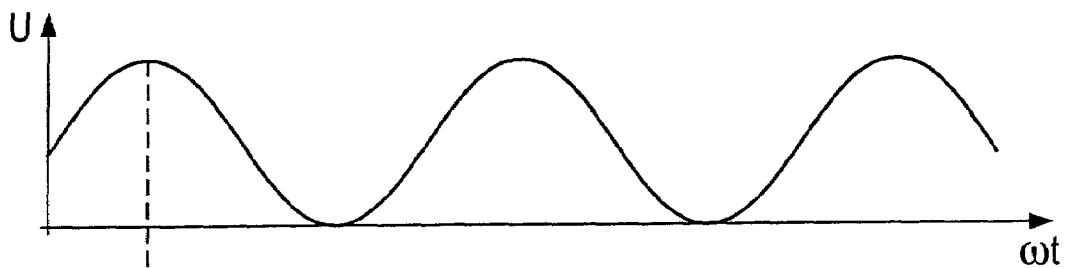
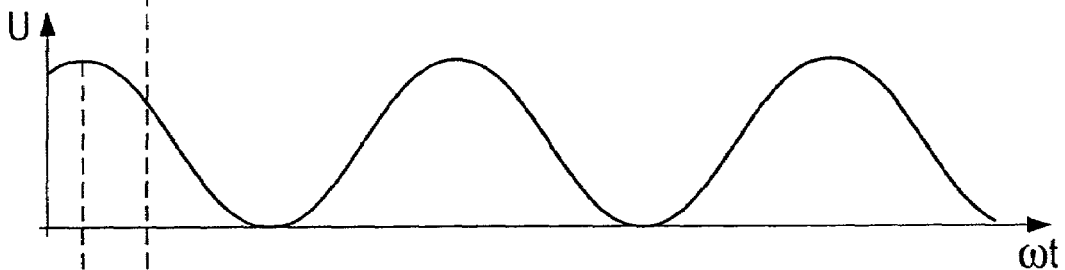
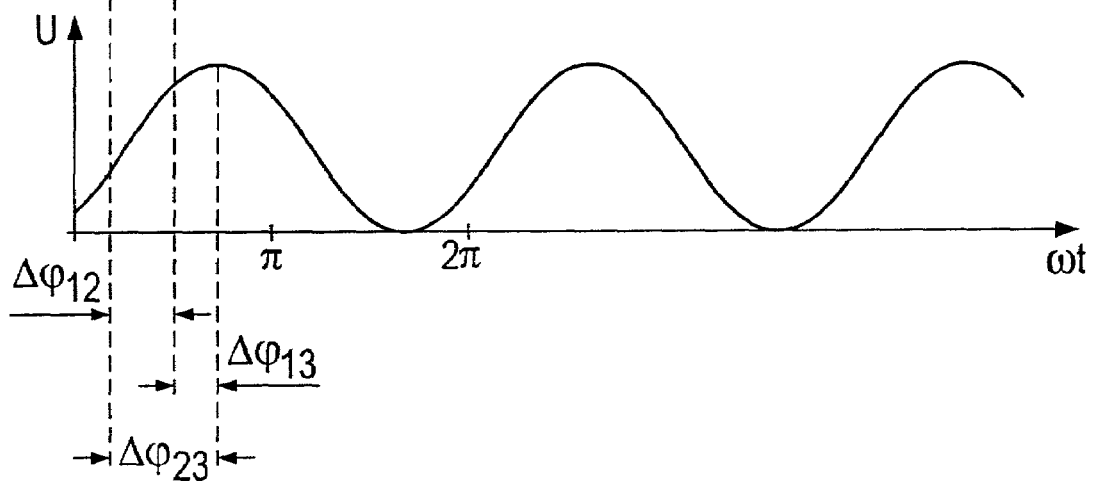

METHOD OF DETERMINING THE POSITION OF AN OBJECT AND CONTROLLING ACCESS TO AN OBJECT OR USE OF AN OBJECT

CLAIM FOR PRIORITY

This application claims priority to German Application No. DE 10045776.2 filed on Sep. 15, 2000, which is hereby incorporated in its entirety by reference.

TECHNICAL FIELD OF THE INVENTION

The invention relates to a method of determining a position of an object and to a method of controlling access to an object or use of the object, in particular a motor vehicle. The invention similarly relates to an access-control and driving-authorization device for a motor vehicle.

BACKGROUND OF THE INVENTION

Radio navigation systems, for example the LORAN system (Long-range navigation), are known in the art from, for example, seafaring. In these systems, pulses or signals are transmitted at fixed points in time from a number of fixed stations. In a receiver, for example a ship, the position of the ship is determined from the differences in the signal transit times of the signals received.

However, the accuracy of the positional determination lies in a range of inaccuracy of several 100 meters. A more accurate position-determining system is the GPS (Global Positioning System), in which time information of a highly accurate clock is additionally transmitted by satellites.

The Global Positioning Systems cannot be used to locate the position of an object, for example, inside a building or a motor vehicle, since the signals of the satellites are blocked even by relatively small items.

To determine the position of an object inside a building, a system similar to the LORAN system is disclosed in Matthew S. Reynolds: "A Phase Measurement Radio Positioning System for Indoor Use", M.I.T., Feb. 3, 1999. In this method, the position in a building is determined with the aid of transit time measurements, similar to the LORAN system. The transmitters in this case transmit sinusoidal signals at low frequency. The position is determined by differences in transit times.

Each transmitting signal is necessary if positions are to be determined exactly using the known systems many transmitting stations. Only then can a spatial position be determined. For a more accurate positional determination, additional correction-signal transmitters are necessary, for example in the case of DGPS (Differential GPS).

SUMMARY OF THE INVENTION

In one embodiment of the invention, there is a method of determining the position of a movable object. The method includes, for example, transmitting a signal in an electromagnetic field from at least two transmitting units which are arranged stationary in an object, and measuring the distance between the movable object and the stationary object with the aid of signal transit times using a receiver arranged in the movable object, wherein the receiver has receiving antennas and ascertains the direction of field vectors of electromagnetic fields generated by the receiving antennas, and the receiver ascertains from the direction of the field vectors and the signal transit times the position of the movable object with respect to the transmitting units of the stationary object.

In another aspect of the invention, the signals are transmitted by the transmitting unit one after the other in time and at time intervals in relation to one another.

In another aspect of the invention, phase differences of the transmitted signals at the receiving location are ascertained for a transit time measurement.

In yet another aspect of the invention, the time intervals of two pulse trains of defined lengths are evaluated for a transit time measurement.

In another embodiment of the invention, there is a method of controlling an object. The method includes, for example, transmitting an interrogation signal and waiting for a response signal using a stationary arranged transmitting and receiving unit, and transmitting the response signal using a code generator, code information of which is checked in the transmitting and receiving unit for authorization enabling, with the transmitting and receiving unit, access to or use of the object if the response signal is authorized, wherein the interrogation signal is transmitted over a number of antennas arranged in a spatially distributed manner, and the position of the code generator is ascertained from a signal transit-time measurement of the interrogation signals received by the code generator and from direction of the field vectors.

In another aspect of the invention, the response signal is generated and transmitted by the code generator when the position of the code generator lies within a predetermined area around the antennas.

In another aspect of the invention, the position ascertained by the code generator is transmitted as a value in the response signal to the transmitting and receiving unit and the transmitting and receiving unit enables access to or use of the object when at least one of the code information included in the response signal coincides with expected nominal code information, and the position of the code generator included in the response signal lies within a predetermined area around the antennas.

In another embodiment of the invention, there is an access-control and driving-authorization device. The invention includes, for example, a transmitting and receiving unit which is arranged in an object and can transmit and receive signals, and, a code generator which has a receiver and a transmitter by which signals can be received and transmitted, wherein the transmitting and receiving unit is connected to a number of spatially distributed antennas, over each of which an interrogation signal is transmitted, the receiver has a number of receiving antennas, which are pointing in different spatial directions and with which the interrogation signals are received, the receiving antennas being connected to a field-strength measuring device and an evaluation unit, in which the direction of the field vectors are ascertained on the basis of measured field strengths of the received signals, and the code generator has a signal transit-time measuring device, which measures the signal transit time of the interrogation signals between the transmission by the antennas in the object and reception by the receiver.

BRIEF DESCRIPTION OF THE DRAWINGS

Exemplary embodiments of the invention are explained in more detail below with reference to the schematic drawings, in which:

FIGS. 3A to 3C show exemplary signal characteristics of received signals.

DETAILED DESCRIPTION OF THE PREFERRED EMBODIMENTS

The invention discloses determining the position of an object as accurately as possible, without great expenditure. The invention also discloses reliably determining a position of an authorized user seeking access to an object or use of the object.

In the method, the position of an object is ascertained with respect to a reference object by signal transit times. Alternatively, the position is obtained by ascertaining a direction from which signals are received. For access to a closed area or use of an object, it is necessary that the position of an object demonstrating authorization lies within a predetermined locational area.

A method of determining a position of an object is explained in more detail below on the basis of an exemplary embodiment in relation to an access-control and driving-authorization device for a motor vehicle. In this embodiment, a user desires access to a locked object (for example, a motor vehicle) with the aid of an object providing authorization (for example, a code generator) or enabling the object (for example, release the immobilizer of the motor vehicle and drive the motor vehicle). To this end, the invention determines the position of the movable, locationally variable object (for example, the code generator).

A number of antennas 1 to 5 (see, for example, FIG. 1) are arranged in a spatially distributed manner in the motor vehicle. The antennas 1–5 are connected in each case to a transmitting unit and a control unit (not shown), which control the transmission of signals. Transmitted from the antennas 1–5 are signals (represented in FIG. 1 as lightning-shaped arrows), and are represented in more detail in FIGS. 2A to 2C. These signals are also referred to as transmitted signals or interrogation signals.

A portable code generator 6 serves as the object which attempts with the aid of transmitted, coded signals to demonstrate authorization for access or use and the position of which is to be determined. This code generator receives the signals transmitted if it is arranged within the range of the transmitted signals. The antennas 1–5 in this case transmit signals both into the outside space around the motor vehicle and into the inside space, in order to operate a code generator 6 possibly located there. Consequently, the entire area within a physically predetermined range around and in the motor vehicle is "covered" in radio transmitting terms by interrogation signals.

Figure 2A:
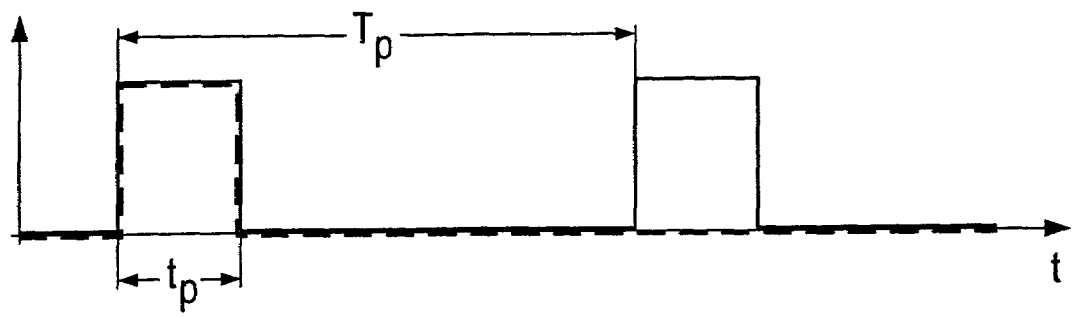
FIGS. 2A to 2C show exemplary signal characteristics of transmitted signals.
Figure 2B:
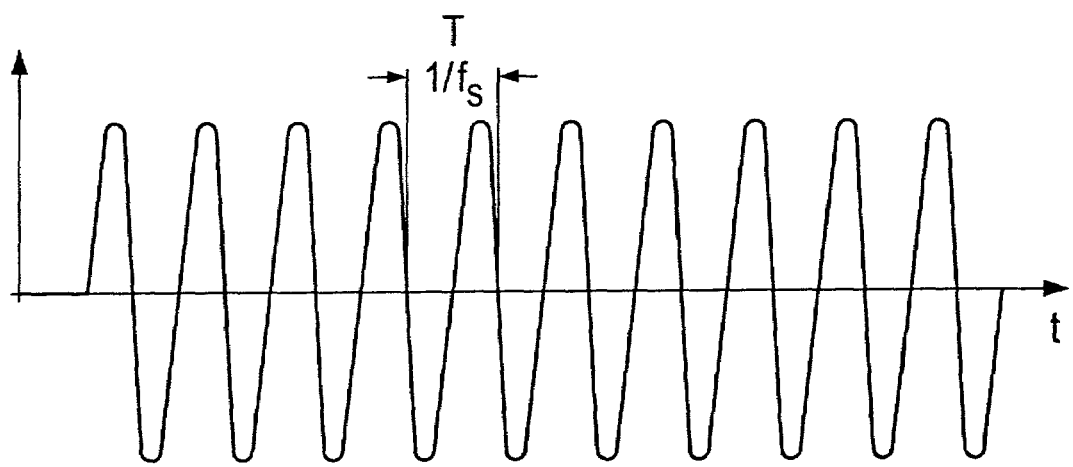
Figure 2C:
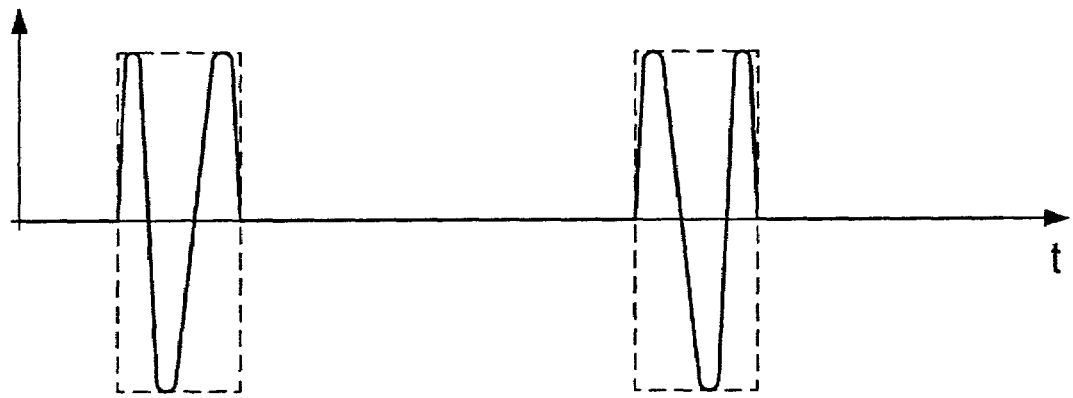

The antennas 1–5 may, in this case, periodically transmit pulse trains with a period duration $T_p$ and a pulse duration $t_p$ (FIG. 2A). Similarly, sinusoidal signals may be transmitted with a fixed period duration $T=1/f_s$ (i.e. with the frequency $f_s$) (see, for example, FIG. 2B). A mixture of pulse trains and sinusoidal signals may also be transmitted, as is represented in FIG. 2C.

It is assumed, in this exemplary embodiment, that signals are transmitted as sinusoidal signals from the antennas 1–3.

The signals received by the code generator 6 are represented in FIGS. 3A to 3C. Represented in FIG. 3A is the signal received by the code generator 6 which originates from the antenna 1. Represented in FIG. 2B is the signal of the antenna 2, and represented in FIG. 3C is the signal of the antenna 3, in each case at the receiving location (i.e. the code generator 6).

Figure 1:
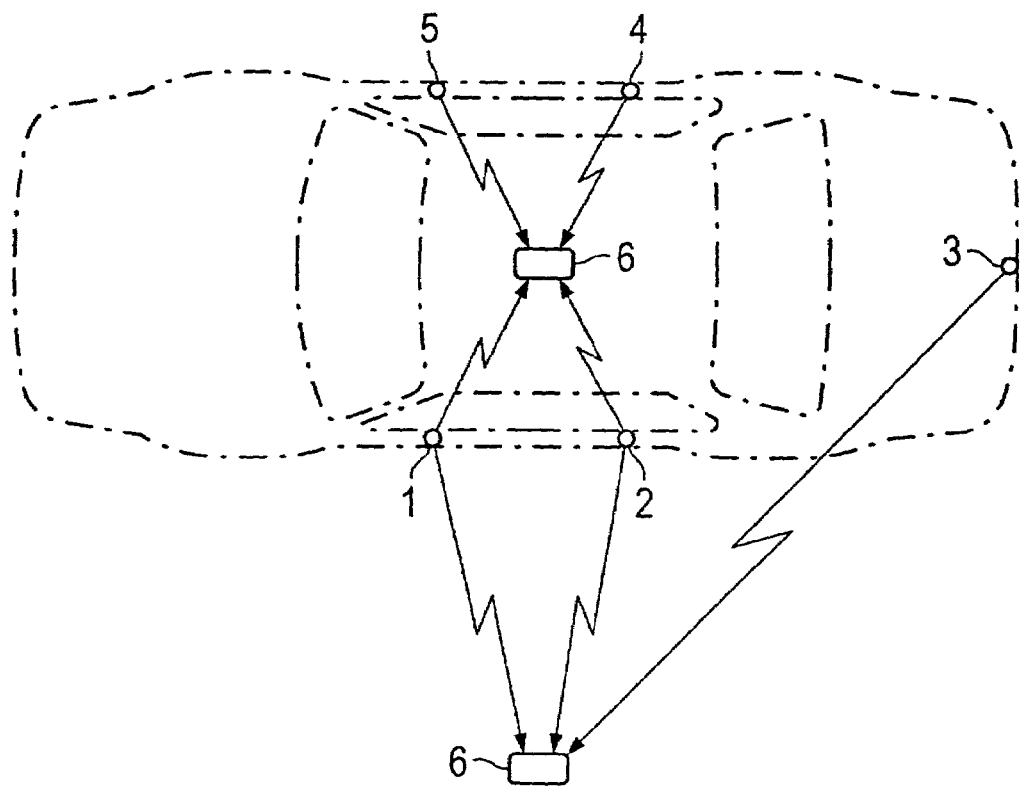
FIG. 1 shows an exemplary access-control and driving-authorization device for a motor vehicle.

If all the signals were transmitted at the same point in time with the same phase position, a phase difference $\Delta\phi_{xy}$ (where x, y=1, 2, . . . 5) between the various signals represents—on account of the same transmission rate in air—a difference in the signal transit time (time which the signals require from the antenna to the code generator 6; compared to the arrow length of the schematically represented lightning-shaped arrows in FIG. 1), and consequently a distance from the antennas 1–5. With a known frequency and propagation rate=speed of light, the distance between the antennas 1–3 and the code generator 6 can be ascertained from the phase differences $\Delta\phi_{12}$ between the signals of the antennas 1 and 2, $\Delta\phi_{13}$ between the signals of the antennas 1 and 3 and $\Delta\phi_{23}$ between the signals of the antennas 2 and 3.

Since the locations where the antennas 1–5 are fitted in the motor vehicle are known, a position of the code generator 6 with respect to the antennas 1–5 can be roughly ascertained from the signal transit times (these correspond to the respective distances from the antennas 1–5), in a way similar to the known LORAN method.

In addition to the signal transit times, the direction from which the signals are received is ascertained by the code generator 6. Since the locations of the antennas 1–5 within the motor vehicle are known, the position of the code generator 6 can likewise be ascertained from the directions from which the signals are received in the code generator 6. According to the invention, these two measuring methods are used in a complementary way, whereby the position of the code generator 6 is ascertained with great accuracy.

Figure 6:
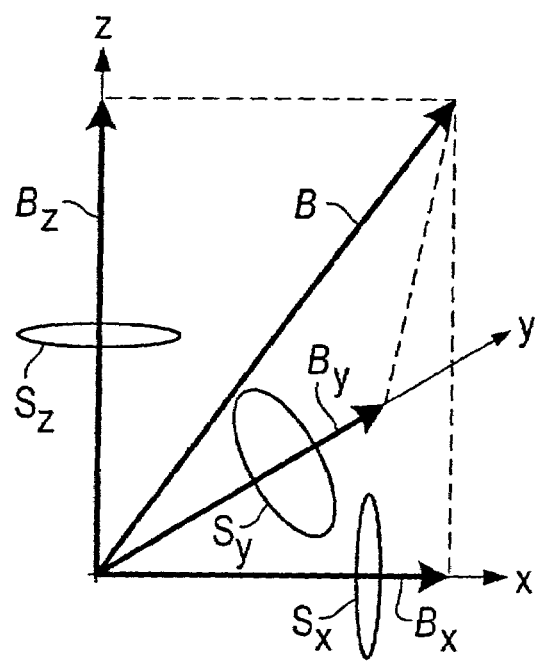
FIG. 6 shows an exemplary spatial representation of a field vector.
Figure 5:
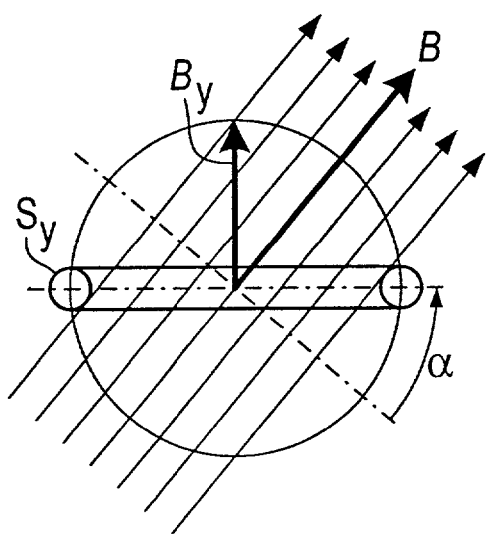
FIG. 5 shows an exemplary field pattern of a magnetic field generated by a transmitting antenna at the location of a receiving antenna.

The directions from which the signals are received are ascertained with the aid of the received field vectors of the electromagnetic fields. For purposes of this example, an inductive transmission by means of coils as antennas at 125 kHz is considered below. In this case, a magnetic field with a magnetic field vector B is transmitted by each transmitting antenna 1–5 (see, for example, FIGS. 5 and 6). The magnetic field propagates at the speed of light. The magnetic field—since it is a low-frequency magnetic field—is damped greatly in its field strength, depending on the distance from the transmitting antenna, with the result that the range of a magnetic field, and consequently of the transmitted signals, is only a few meters.

Figure 4:
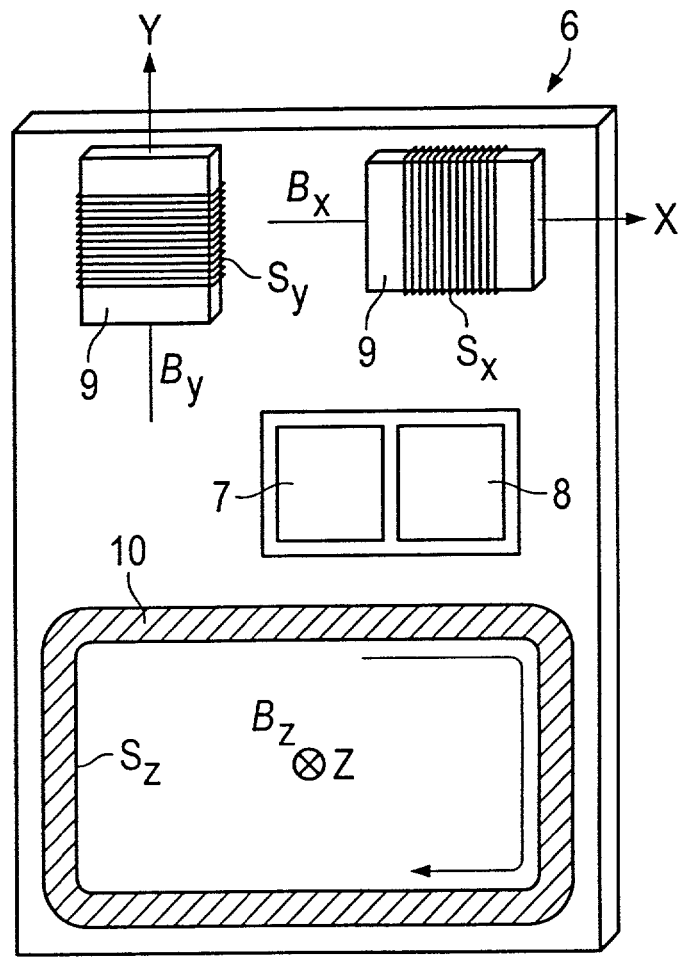
FIG. 4 shows an exemplary block diagram of a portable code generator for the access-control and driving-authorization device according to FIG. 1.

In order to ascertain the field vectors B, i.e. the direction of the field vectors B at the receiving location, a 3D code generator (three-dimensional code generator 6) is used for example, as represented in FIG. 4. The generator has three coils $S_x$, $S_y$ and $S_z$ as receiving antennas, which can in each case point in one of the three directions according to the Cartesian system of coordinates, and can detect field components in these directions with respect to their magnitude. Consequently, the field strengths of the magnetic field can be ascertained in the x-y-z direction in a way corresponding to FIGS. 5 and 6. Consequently, the subvectors $B_x$, $B_y$ and $B_z$ of the field vector B are obtained. As known from geometry—the direction of the field vector B with its solid angles can be ascertained from the subvectors. This may take place, for example, by the Cartesian system of coordinates being converted into a system of polar coordinates, from which the direction (i.e. two polar angles together with the absolute value of the field strength) can be ascertained.

The code generator 6 determines with its coils $S_x$, $S_y$ and $S_z$ (i.e. with the voltages respectively induced by the magnetic field in the coils $S_x$, $S_y$ and $S_z$), and measuring device 7 connected to said coils and having an evaluation unit and control unit 8, the field strength of each subvector $B_x$, $B_y$ and $B_z$ in each spatial direction. This makes it possible to produce a virtual system of coordinates in which the code generator 6 is its origin. This is true on condition that the coils $S_x$, $S_y$ and $S_z$ are arranged relatively close to one another or can be considered as united at a point. This is the case with a small portable code generator 6 which can be carried by a user in any pocket.

It is possible to determine from the individual, measured absolute amounts of the subvectors $B_x$, $B_y$ and $B_z$ the directions of all the field vectors B (one field vector B for each received signal), which map the relative position of the antennas 1–5 with respect to the origin of the coordinates (code generator 6), and the absolute amounts of the field vectors |B| by a corresponding design of the measuring device 7, which is connected to the coils $S_x$, $S_y$ and $S_z$.

On the basis of the directions calculated in this way, it can be ascertained from the code generator 6 with known geometrical aids where exactly it is located with respect to the transmitting antennas 1–5. According to FIG. 1, the code generator 6 inside the motor vehicle ascertains field vectors from the signals of the antennas 1, 2, 4 and 5 from virtually every direction. The code generator 6 outside the motor vehicle, on the other hand, does this from the direction toward the motor vehicle.

From the exact direction, the position of an object (in this case, the code generator 6) is ascertained with the aid of wirelessly transmitted signals.

In the exemplary embodiment, the coils $S_x$ and $S_y$ are designed as ferrite coils with a ferrite core 9, whereas the coil $S_x$ is designed as an air-core coil 10 (for example a conductor track in coil form). For the invention, however, it does not matter how the coils $S_x$, $S_y$ and $S_z$ are designed, but that the field direction is sensed, for example on the basis of the received field strength of the individual spatial field components $B_x$, $B_y$ and $B_z$.

With such a code generator 6, a method can be carried out for controlling access (keyless access in a purely electronic way) to the motor vehicle or else enabling use of the motor vehicle. For this purpose, a transmitting and receiving unit (not shown), which is connected to the antennas 1–5, is arranged in the motor vehicle. An interrogation signal is transmitted over each antenna 1–5 in the preferred embodiment (or at least three of the antennas 1–5), and a response signal awaited. If the code generator 6 receives the interrogation signal, it generates for its part a response signal, which is sent back to the motor vehicle.

In the transmitting and receiving unit in the motor vehicle, the response signal is tested for its authorization and, given authorization, access to or use of the motor vehicle is enabled. However, only if the position of the code generator 6 has been ascertained and it has been found that the code generator 6 is located in a predetermined area with respect to the motor vehicle is access provided.

Since the interrogation signal is transmitted over a number of antennas 1–5 arranged in a spatially distributed manner, the code generator 6 can roughly determine its position with respect to the antennas 1–5 in the motor vehicle, and consequently with respect to the motor vehicle, from a measurement of the signal transit time (this is typically accomplished by means of a phase difference measurement). In addition, the code generator 6 ascertains the directions of the field vectors B of the individual received signals. By a combination of the signal transit-time measurement and the field vector direction, the position of the code generator 6 is determined.

The code generator 6 can then generate its response signal if its position lies within a predetermined area around the motor vehicle or inside the motor vehicle. The permissible position is governed by the circumstances of access or use. For access (this includes locking and unlocking the door locks, tailgate locks, etc.), just a position outside the motor vehicle but in the vicinity of the motor vehicle is necessary. For use of the motor vehicle, the code generator 6 is detected inside the motor vehicle (for example, in the passenger compartment). Or, for example, it may also be provided that use is only allowed if the code generator 6 is detected in the area of the driver's seat.

It may similarly be provided that the code generator 6 transmits the position ascertained by it as a value to the motor vehicle together with the response signal. The transmitting and receiving unit in the vehicle would then ascertain from the response signal where the code generator 6 is located. For example, the position may be extracted from the signal. If it is located within a predetermined area and the code information included in the response signal is found to be authorized, access can be enabled or use allowed.

The signals, in the preferred embodiment, are transmitted by the antennas 1–5 one after the other, and at time intervals in relation to one another. This avoids superposing of the signals. Each signal can be evaluated distinctly with respect to its direction and transit time.

The time intervals of the transmission in relation to one another are taken into consideration in the measurement of the phase differences. If, instead of sinusoidal signals, pulse trains of a defined length are transmitted, these pulse trains are likewise transmitted at time intervals in relation to the pulse trains, which are transmitted over the antennas 1–5, and the times for the rising edges or falling edges of the pulses of the pulse trains are correspondingly evaluated.

The transit time of signals in free space can then be used to determine the distance from the antennas 1–5. With a triangulation method, i.e. with a number of spatially distributed starting points, the position can be determined more accurately. In addition, the field direction of each signal at the receiving location can be determined from each signal. From the field directions, the position of the code generator 6 can likewise be determined. If the two methods, transit time and field direction, are combined with each other, a still more accurate positional determination is ensured.

Such methods of determining the position of a movable, locationally variable object and methods of controlling access to an object which is stationary—at least at the point in time of the positional determination—or of use of the object can also be used in the case of other objects whenever the position of a movable object has to be accurately determined. Such methods can also be used for access to or the use of an object if the position of an object demonstrating authorization lying in a predetermined locational area is a prerequisite for access or use.

Ascertainment of the direction of the field vectors has the advantage that signals which are transmitted by the antennas 1–5 could only be listened to by third parties without authorization if the spatial receiving conditions are likewise detected. However, a complex receiving device and a corresponding evaluating unit would be necessary for this. If the spatial receiving conditions are not detected, unauthorized reproduction does not lead to access being granted or use being enabled, since no positional determination can be carried out.

Furthermore, the invention has the advantage that the authorized user must be in the vicinity of the object as soon as access is granted or use is enabled. Consequently, he or she can always observe whether an unknown, unauthorized person is seeking access without authorization or wanting use without being allowed.

An object for access control or use control may be a motor vehicle, a building, a garage or some other locked or secured area. Similarly, the method according to the invention may be used for access to or enabling use of a computer or a telephone.

The term "code generator" is to be understood as meaning a device which transmits a coded signal in order to demonstrate its authorization. The code generator 6 is a device which—irrespective of its outer form—is suitable for controlling a locking system (locking or unlocking of locks, enabling use). For example, a card the size of a check card, on which the components of the code generator 6 are arranged, is usually used for a keyless access-control and driving-authorization device.

Transmission of the transmitted signals may take place, for example, at a frequency of approximately 125 kHz. The response signals can usually be sent back at approximately 433 MHz. It is also readily understood that other carrier frequencies at which the signals are transmitted are also possible. However, the range of the signals should be limited in the preferred embodiment, such that the transmitted signal can only be received by movable objects located in the vicinity of the transmitting antennas.

Many antennas by which the interrogation signals are transmitted may be arranged in the stationary object. In the preferred embodiment of the invention, however, the antennas 1–5 are arranged in a spatially distributed manner and one transmitted signal is respectively transmitted over a number of antennas 1–5.

The interrogation signal and the response signal are code signals which in each case have code information. The code information may be a binary coded signal which has many bit locations. By encryption, the code information changes with each new encrypting operation. The code information may precede or follow a number of bits which are possibly required for dependable data transmission. Other controlling information, such as the position of the code generator 6, may also be included in the response signal. The code information is compared with expected nominal code information. If it at least largely coincides, there is authorization of the code information and consequently lawful use of the code generator 6.

What is claimed is:

1. An access control and usage control device for a motor vehicle, comprising:
    a transmitting and receiving unit disposed in the motor vehicle, which can send and receive signals; and
    a portable code generator, which includes a receiver and a transmitter, with which the signals can be received and transmitted, wherein
    the transmitting and receiving unit is connected to multiple antennas spatially distributed in the motor vehicle, through each of which interrogation signals can be transmitted,
    the receiver of the portable code generator includes multiple reception antennas, with which the interrogation signals are received, wherein the reception antennas are connected to a field intensity measuring device, in which directions of field vectors are determined on the basis of measured field intensities of the received signals,
    the portable code generator includes a signal delay measuring device, which determines a signal delay difference or a phase difference between the interrogation signals, and
    the portable code generator includes an evaluation unit which determines a position of the portable code generator in relation to the motor vehicle on the basis of the directions of the field vectors and either the signal delay difference or the phase difference.

2. A method for controlling access to a motor vehicle or use of a motor vehicle with a transmitting and receiving unit disposed in the vehicle, which unit transmits an interrogation signal and listens for a response signal, and having a portable code generator, which returns the response signal, and an authorization contained in the code information therein is checked in the transmitting and receiving unit, wherein the transmitting and receiving unit, upon receipt of an authorized response signal, authorizes access to or use of the motor vehicle, comprising:
    transmitting the interrogation signal through multiple antennas spatially distributed in the motor vehicle;
    receiving the interrogation signal through multiple reception antennas of the portable code generator oriented in various spatial directions, wherein field vectors of each interrogation signal are determined by the reception antennas on the basis of measured field intensities of the received signals;
    determining signal delay differences or phase differences between the interrogation signal; and
    determining the position of the portable code generator in relation to the motor vehicle on the basis of directions of the field vectors and one of the signal delay differences and phase differences.

3. The method according to claim 2, wherein the interrogation signals are transmitted in a time sequence and at time intervals relative to one another.

4. The method according to claim 2, wherein, to measure delay, time intervals between two pulse trains from different interrogation signals are evaluated, wherein the pulse trains exhibit, defined lengths.

5. The method according to claim 2, wherein the response signal is generated and transmitted by the portable code generator only if the position of the portable code generator is determined to be located within a predetermined range around the multiple antennas.

6. The method according to claim 2, further comprising transmitting the position determined by portable code generator to the transmitting and receiving unit as a value in the response signal, wherein the transmitting and receiving unit authorizes access to or use of the motor vehicle only if code information contained in the response signal matches expected reference code information and the position of portable code generator contained in the response signal lies within a predetermined range around the multiple antennas.

* * * * *